3,372,039
FLUOROACID AND ZIRCONIUM OXYHALIDE COMPOSITIONS AND MATERIALS TREATED THEREWITH
Domenick Donald Gagliardi, East Greenwich, R.I., assignor to Colgate-Palmolive Company, New York, N.Y., a corporation of Delaware
No Drawing. Filed Apr. 27, 1964, Ser. No. 362,996
19 Claims. (Cl. 106—2)

ABSTRACT OF THE DISCLOSURE

Water, oil, strain and soil repellency are obtained on textiles and similar materials by treating them with an aqueous composition containing zirconium oxyhalide and a highly fluorinated carboxylic acid of from 3 to 17 carbon atoms and preferably one of from 7 to 17 carbon atoms having at least 70% of the hydrogen atoms replaced by fluorine atoms.

---

The present invention relates to compositions and methods particularly suitable for the treatment of textile and similar materials, and to the resulting products having improved properties thereby. More particularly, the present invention relates to unitary aqueous compositions which impart to textiles and other materials increased repellency to wetting or soiling.

The textile industry for a long time has sought a process for treating textile materials which can, in addition to rendering textiles water repellent, render textiles oil repellent, stain repellent (to both oil and water borne stains) and soil repellent. Heretofore, a number of compositions have been available which are capable of providing water repellency or oil repellency, but no composition has been available which is capable of providing oil, soil, stain and water repellency. In particular, a number of compositios are available which are capable of providing a wter repellent fabric, but treatment with such compositions renders the fabric more susceptible to either oil staining or dry soil staining since the compositions have a far greater affinity for such soils than the untreated fabrics. Accordingly, the fabric treating compositions which are presently available are far from satisfacory if it is desired to provide textiles or other materials with a finish which is not only water repellent but also repellent to oil, water and oil borne stains and resistant to soiling by particulate soils.

In addition to the commercially available compounds, other compounds have been suggested for use in water repellent compositions. Typical are the highly fluorinated compounds such as the perfluorocarboxylic acids which are relatively new materials and have been suggested broadly for a variety of possible applications such as intermediates in the preparation of polymers and surface active agents, and particularly for derivatives useful in the treatment of textiles. The perfluoro-carboxylic acids have been reacted with other materials to form certain polyvalent metal complexes or salts which have been proposed as useful in producing a water or oil-repellent finish upon application to textiles or the like. One group of materials with which they have been reacted are the zirconium salts.

The prior art broadly suggests and discloses techniques for using the perfluoro acids and zirconium salts in order to provide water and oil repellency to textile fabrics. However, all of such techniques require successive applications of one material and then the other and are undesirable since the degree of repellency provided at minimum concentration of ingredients is inadequate for most commercial purposes. In addition, the process itself, which is a two step mordanting process, is extremely time consuming, inefficient with respect to the utilization of treating materials and in general far more costly than other textile treating procedures. Furthermore, neither material when applied individually to the textile materials provides oil, soil, stain or water repellency.

In accordance with the present invention, it has now been discovered that materials may be treated with a mixture of a higher substantially fluorinated carboxylic acid and a zirconium oxyhalide in an aqueous medium which when dried forms a surface or finish which is particularly repellent to water, oil and oil and water borne stains and is resistant to soiling by particulate soil in addition to having other desirable properties.

It is common knowledge in textile treating that the mordanting technique is useful for applying two textile treating materials which cannot normally be applied together due to the differences in electronic charge and that when such materials are combined before applying to textiles, precipitation generally occurs preventing use of the material. In the case of the present invention, while the materials employed have dissimilar charges, it has been unexpectedly found that they may be combined, at the critical ratios set forth, and when applied to textile materials provide an extremely high degree of oil, soil, stain and water repellency. The present invention provides many advantages over the extremely hazardous and inefficient prior art techniques such as those employing organic solvent solutions of zirconyl oxyhalide and perfluoro carboxylic acids. Accordingly, it will be seen that the present invention provides many advantages over either of the common prior art techniques e.g. mordanting or application of solvents containing a zirconyl oxyhalide and perfluoro carboxylic acids. In accordance with the present invention, it is possible to carry out a one step technique with an aqueous solution which provides a degree of repellency far greater than has been heretofore obtainable.

It has been unexpectedly found in the case of the present invention that when the fluoroacids are combined with zirconyl oxyhalide salts, a colloidal suspension is formed which is eminently suitable for treating textile materials to provide a high degree of oil, soil, stain and water repellency. As used hereinafter, the combination of fluoroacids and zirconyl oxyhalide salts may also be referred to as a solution. A preferred embodiment relates to such compositions comprising a higher perfluoro moncarboxylic acid and a zirconyl chloride which impregnate the textile and upon drying, form in situ a unique and complex derivative or product on the fibers so as to render them highly resistant to soiling, highly hydrophobic and oleophobic, and resistant thereby to staining and soiling by wet and dry soil. Various other distinctive aspects of the present invention will be apparent from the following description.

Some substantially fluorinated acids are known in the art and generally have a long aliphatic saturated chain within the range of 6 to 18 and preferably 8 to 12 carbon atoms wherein at least the major amount and preferably at least 70% of the replaceable hydrogen atoms attached to carbon have been replaced by fluorine atoms and the terminal carbon is $CHF_2$ and preferably $CF_3$. The materials useful in the present invention are the highly fluorinated carboxylic acids which have the formula [Z]COOH where Z is a fluorocarbon radical containing at least 3 carbon atoms and preferably 7 to 17 carbon atoms wherein substantially all and preferably at least 70% of the hydrogen atoms have been replaced by fluorine atoms and the carbon radical does not contain hydrophilic groups. Most preferably, the materials employed are those which have the formula $$F(CF_2)_nCOOH(C_nF_{2n+1}COOH)$$

wherein $n$ is an integer in the range of 3 to 17 and preferably 7 to 11. Examples thereof are perfluoro octanoic, caprylic, capric, lauric, myristic, tridecanoic, palmitic and stearic acids. These perfluoro materials may contain mixtures of variable chain length depending upon their method of manufacture and the use of such mixtures is usually economical and within the scope of the invention.

The fluorinated acids of corresponding chain length having a minor number of hydrogen atoms attached to carbons may be employed also and are known in the art. Examples are the fluorinated acids wherein one or two hydrogen atoms are attached to carbon atoms, such as on the alpha, beta or gamma carbon atoms, or the terminal carbon from the carboxylic group. Included therein are compounds having the formula $H(CF_2)_nCOOH$ such as 7-hydro perfluoro heptanoic acid, 9-hydro perfluoro nonanoic, 11-hydro perfluoro undecylinic acid and similar acids as described above. Examples of the fluoroacids having hydrogens intermediate on the chain are 1, 2 or 3 hydro perfluoro octanoic and decanoic acids; and 1,2 dihydro perfluoro hexanoic, octanoic and decanoic acids. The fluorinated aliphatic chain may have substituted therein other substituents which are inert or do not substantially adversely affect the desired properties and in particular, the oil, water and soil repellency. Further materials are the perfluoro acids having a minor amount of chlorine substituted thereon such as on the alpha, beta, intermediate or terminal carbon atoms. Examples are the same acids described above wherein the minor amount of the hydrogen substituents are replaced by chlorine atoms, e.g. 8-chloro perfluoro octanoic and 7-chloro perfluoro heptanoic acids; 1, 2 or 3 chloro perfluoro octanoic, 1,1 dichloro or 1,2 dichloro perfluoro octanoic and decanoic acids, and the like. In addition to the known prior art fluorinated acids which may be employed, it is also possible to employ fluorinated carboxylic acids containing aromatic substituents. Typical of such acids are perfluorobenzoic acid and parapentadecyl fluoro octabenzoic acid.

While all of the zirconyl oxyhalide salts may be employed in carrying out the present invention, the zirconium oxyhalide salts which are preferred are the zirconyl chlorides such as zirconyl chloride octahydrate ($ZrOCl_2 \cdot 8H_2O$) and the more basic salts such as zirconyl hydroxy chloride [$ZrO(OH)Cl \cdot 8H_2O$] and dizirconium trioxychloride. The corresponding bromides and iodides may be used if desired.

The combination of the fluoroacid and zirconyl oxyhalide salt is applied to fibrous material in any suitable manner effective to form said repellent and resistant surface or finish. In general, the mixture is applied in the form of a liquid comprising an aqueous solution of these ingredients so as to impregnate or uniformly treat the material followed by drying or curing. Depending upon the particular method of application, the concentration of the treating liquid may vary widely. For example, the treating solution or dispersion may contain from about 0.5 up to 50% by weight of solids, preferably from about 1 to 5%. The composition may be applied by spraying, padding, dipping, exhausting, brushing, roll-transfer, knife-coating, soaking in a bath with or without agitation, or in any other suitable manner.

The preferred method of applying these ingredients is to form a bath containing these ingredients in an aqueous solvent medium containing these ingredients in solution or fine dispersion, and dip or soak the fabric for a predetermined time correlated with the concentration of the bath. The concentration of the ingredients in the bath is not critical provided sufficient amounts are used to result in the desired pick-up of the ingredients on the fibrous material to render it resistant to wetting and staining after drying. In general, the ratio of fluoroacid to zirconyl oxyhalide salt is from about 2:1 to about 1:5 and preferably about 1:2 by weight. In the bath, it is preferred that the fluoroacid is used in an amount 0.5 to 50% by weight and the zirconyl oxyhalide salt in an amount of 0.25 to 25% and preferably 1 to 5% by weight, with particularly effective results where the ratio of the zirconyl oxyhalide salt to the acid is at least 1:1 by weight. It has been found also that the bath concentration may be comparatively low e.g., 0.5% of the fluoroacid and 0.5% of the zirconyl oxyhalide salt.

It has been found that when the fluoroacid and zirconyl oxyhalide salts are employed in combination substantial substantive effect is provided on the textile. When these ingredients are employed individually, the textile material treated provides neither oil, soil, stain or water repellency.

The fibrous material or textile fabric is immersed in the liquid for a sufficient period of time to form a suitable repellent surface when dry. In general, it is preferred that immersion be carried out at room temperature. The ingredients may be admixed in any suitable manner so as to form a liquid, paste or dry concentrate which can be readily diluted with water to form the treating solution.

While generally, for textile treating purposes, it is desired to dilute the admixture, the concentrated or dry forms may also be used if desired for use in materials such as polishes, ceramic coatings, lacquers, and the like. The ingredients may be admixed in water up to the limit of their solubilities so as to form a concentrated or saturated solution, which can then be added to water prior to use to form a dilute solution. The liquid concentrates may be in the form of a suitable suspension, emulsion and paste-like product. While the ingredients may be added separately to the solvent medium to form a treating bath, it is advantageous to combine such ingredients in a suitable package so that they may be added to the bath as a single product in fixed concentration. Such compositions may be prepared in any suitable container or package such as in a metal or plastic container for adding a liquid or spray or as a water soluble plastic envelope containing one or both of the ingredients already admixed or in separate compartments.

After a treatment with these ingredients, the fabric is removed from the bath and then dried in any suitable manner. It has been found that the treated fabric may be dried by exposure to normal atmospheric air currents at normal room temperature which permits ready fixation and curing of the product on the fabric. Alternatively, the coated substrate may be heat treated by any suitable drying equipment. It may be dried by ironing or by application of heated air, infra-red rays, radio frequency up to about 400° F., e.g., 250 to 300° F. may be employed. In general, the drying time is roughly inversely proportional to the temperature and may be from a few seconds to several hours, e.g. 30 seconds to 1 hour. The combined factors of temperature and time depend upon the particular substrate used and the pick-up on the fabric.

An important advantage of the textile treatment in accordance with the present invention is that high temperatures are not required for treatment or drying, nor are catalysts required to convert the films or impregnated product in situ into an insolubilized network in combination with the fibers so as to achieve the repellent finish.

The composition has been found to be particularly effective for the treatment of cotton and other cellulosic materials to produce highly effective water and oil repellent fabrics. Other fabrics including rayon, viscose, nylon, Dacron, wool and other natural and synthetic fibrous materials may be treated similarly to achieve the repellent effect. Other porous materials such as paper, cardboard, leather and the like may be treated also. The treatment may be applied to other suitable surfaces for a wide variety of purposes. Included therein are applications to the surface of metals, glass, porcelain and other vitreous materials, plastic articles in pigmented or clear form.

If desired, these materials may be used in combination with other ingredients to achieve particular desired effects. Thus, there may be added to the bath suitable buffering or pH modifying agents such as sodium chloride in minor amount to adjust the pH to a desired level provided that the zirconyl salt is not precipitated from solution. Materials intended to give an improved feel, hand or anti-static effects or the like may also be added in compatible amounts. If desired, suitable amounts of softener, pigment, extender, filler, delustrant, glossing agent or the like may be incorporated. It will be further understood that the other additives employed will be those which do not interfere with the oil, water, and soil repellency properties.

The following examples are further illustrative of the nature of the present invention, and all amounts specified are by weight unless otherwise indicated.

As used hereinafter the spray rating values were obtained by the American Association of Textile Chemists and Colorists Standard Test Method 22-195. The oil repellency values were obtained by the Minnesota Mining and Manufacturing Company. Oil Repellency Test: 3M Textile Chemicals, Appendix A Test Methods, page 1, publ. 1958.

Example I

| Ingredients: | Percent |
| --- | --- |
| Perfluoro octanoic acid | 1 |
| Zirconium oxychloride octahydrate | 0.5 |
| Water | 98.5 |

The perfluoro acid and the zirconium oxychloride were added separately to the water with stirring to form a homogeneous, translucent solution which was stable upon standing. The solution was padded on 80 square white cotton print cloth to achieve 80% wet pick-up. The impregnated fabric was removed from the solution, and dried in an air oven for 5 min. at 300° F. The treated fabric exhibited a spray rating of 70 and oil repellency rating of 80.

Example II

The procedure of Example I was repeated using 2% of the zirconium salt in combination with the perfluoro acid at a level of 1%. The treated fabric exhibited a spray rating of 50+ and oil repellency rating of 80.

The fabric was also subjected to tests to determine resistance to a large variety of water-borne, oil-based and dry-soil stains, such as olive oil, ketchup, mustard, grape juice, writing ink, carbon black and chocolate. The fabric resisted staining by these materials to a particularly high degree.

Examples III

The substitution of zirconyl hydroxyl chloride in the procedure of Example II resulted in products having effective resistance against wetting.

Example IV

A treating solution was prepared as in Example I and contained:

| Ingredients: | Percent |
| --- | --- |
| Omega hydroperfluorononanoic acid | 1 |
| Zirconium oxychloride octahydrate | 5 |
| Water | 94 |

The solution was padded on to cotton fabric which was then dried 5 minutes at 300° F. When tested against dry soils, a high degree of repellency was found as compared to the untreated fabric.

Example V

A treating solution was prepared as in Example I and contained:

| Ingredients: | Percent |
| --- | --- |
| Chlorofluorocarboxylic acid Cl(FC—CFCl)CFCOOH | 3 |
| Zirconyl hydroxyl chloride | 5 |
| Water | 92 |

The solution was padded on wool flannel and dried 10 minutes at 250° F. A high degree of water and oil repellency resulted.

What is claimed is:

1. A composition particularly adapted for rendering materials repellent to wetting and staining and resistant to soiling by particulate soils which comprises an aqueous solution of a zirconium oxyhalide and a higher substantially fluorinated acid in a ratio from about 1:2 to 5:1 by weight, said acid having the formula [Z]COOH where Z is a fluorocarbon radical containing 3-17 carbon atoms and at least 70% of the hydrocarbon atoms have been replaced by fluorine atoms and the carbon radical does not contain hydrophilic groups.

2. A composition according to claim 1 wherein the zirconium oxyhalide is a zirconium oxychloride.

3. A composition according to claim 2 wherein the zirconium oxychloride is zirconyl chloride octahydrate.

4. A composition according to claim 2 wherein the zirconium oxychloride is zirconyl hydroxy chloride.

5. A composition according to claim 2 wherein the zirconium oxychloride is dizirconium trioxychloride.

6. A process for rendering materials repellent to wetting, soiling and staining and resistant to soiling by particulate soils which comprises treating said materials with a composition as defined in claim 1 and drying said materials to render the surfaces repellent.

7. A process for rendering materials repellent to wetting, soiling and staining and resistant to soiling by particulate soils which comprises treating said materials with a composition as defined in claim 10 and drying said materials to render the surfaces repellent.

8. A process for rendering cellulose material repellent to wetting and staining and resistant to soiling by particulate soils which comprises impregnating said material with a composition as defined in claim 13 and drying the material to form said repellent surface.

9. A process for rendering textile material repellent to wetting and staining and resistant to soiling by particulate soils which comprises impregnating textile material with a composition as defined in claim 14, and drying said impregnated textile to obtain a repellent surface.

10. A composition as defined in claim 1 wherein the ratio of zirconium oxyhalide to fluorinated acid is about 1:1.

11. A composition as defined in claim 10 wherein the fluorinated carbon radical contains from 7 to 17 carbon atoms.

12. A composition as defined in claim 1 wherein the fluorinated acid is a perfluoro acid.

13. A composition as defined in claim 12 wherein the acid contains from 8 to 20 carbon atoms.

14. A composition as defined in claim 12 wherein the concentration of the fluorinated acid is from 0.1 to 5% and that of the zirconium oxyhalide is from 0.5% to 25%.

15. A dried, fibrous material impregnated with a dried residue of the composition as defined in claim 1 and in sufficient amount to convey enhanced water and oil repellency and resistance to soiling by particulate soils.

16. A dried textile fabric rendered water, oil and stain repellent and resistant to soiling by particulate soils impregnated with the dried residue of a composition as defined in claim 13.

17. A process as defined in claim 9 wherein the zirconium oxyhalide is zirconyl oxychloride and the latter and the perfluoro acid are each present at a level of 0.5% by weight.

18. A composition as defined in claim 13 wherein the zirconium oxyhalide is zirconyl oxychloride.

19. A dried textile fabric rendered water, oil and stain repellent and resistant to soiling by particulate soils impregnated with the dried residue of a composition as defined in claim 18.

References Cited

UNITED STATES PATENTS

| 2,316,057 | 4/1943 | Doser et al. | 117—167 |
| 2,498,514 | 2/1950 | Van Mater | 260—429.3 |
| 2,823,144 | 2/1958 | Dalton | 117—121 |

ALEXANDER H. BRODMERKEL, *Primary Examiner.*

T. MORRIS, *Assistant Examiner.*